W. T. DUNCAN.
INTERCEPTING TRAP.
APPLICATION FILED JUNE 22, 1909.

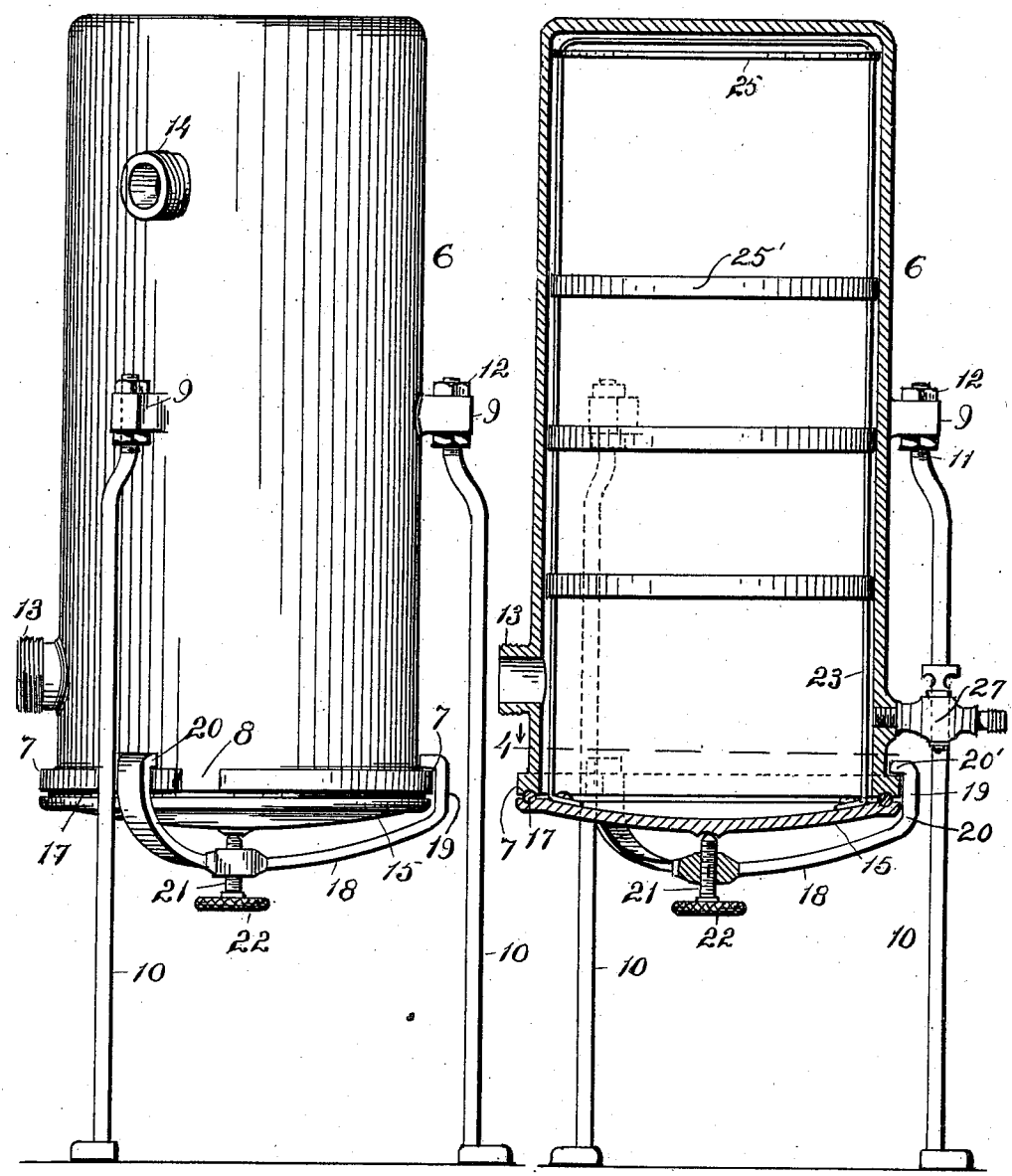

981,593.

Patented Jan. 10, 1911.
2 SHEETS—SHEET 2.

Witnesses:
E. A. Murray
Louis Schwartz

Inventor:
W. T. Duncan,
By
Atty.

UNITED STATES PATENT OFFICE.

WILLIAM T. DUNCAN, OF LOS ANGELES, CALIFORNIA.

INTERCEPTING-TRAP.

981,593.

Specification of Letters Patent.

Patented Jan. 10, 1911.

Application filed June 22, 1909. Serial No. 503,630.

*To all whom it may concern:*

Be it known that I, WILLIAM T. DUNCAN, a citizen of the United States, residing at Los Angeles, in the county of Los Angeles and State of California, have invented certain new and useful Improvements in Intercepting-Traps, of which the following is a specification.

My invention pertains to traps, and it has special reference to what is known in the art as grease traps, which are adapted to be attached to closets and sinks, or the like, whereby grease and other foreign substances are arrested and may be removed, so as to prevent obstructions in pipes. The invention is applicable to other uses where it is desired to remove or catch any solid matter which may be in the liquid or solution. In this application I show the manner of applying it particularly to sinks and closets, as will now be set forth in detail.

Figure 3:
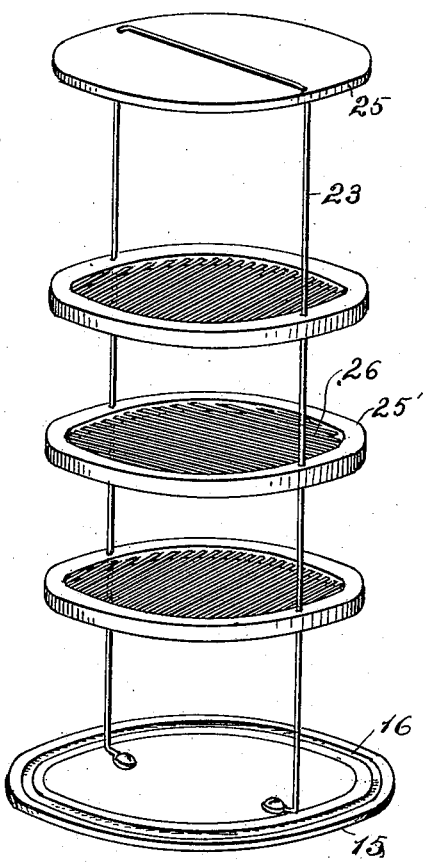
Figure 4:
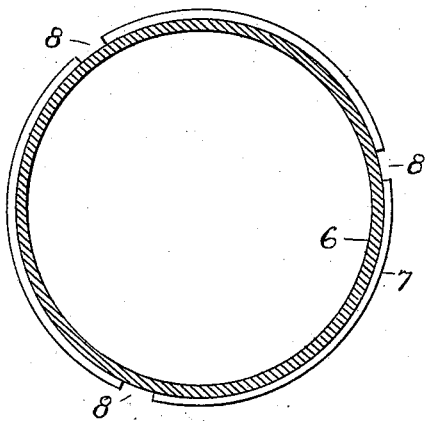
Figure 5:
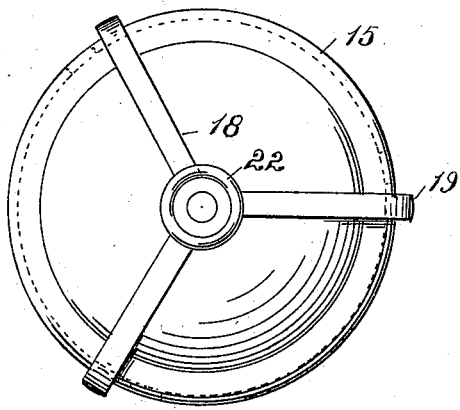

In the drawing, Figure 1 is a side elevation of my improved grease trap. Fig. 2 is a central vertical section of the trap. Fig. 3 is a perspective view of the removable screening grid. Fig. 4 is a horizontal section of the shell, on line 4 of Fig. 2; and, Fig. 5 is a view of the lower end of the shell, showing the removable base and spider which secures the base to the shell.

In constructing my invention I provide a cylindrical shell 6, of suitable size, which may be of cast metal, or otherwise. This has a closed top or end, and an open lower end, this lower end having an exterior flange or rim 7, with three cut-away parts 8. Midway between the ends are projecting lugs or ears 9, having therein vertical holes to receive the upper ends of the legs or standards 10, these standards having, preferably, threaded ends, as at 11, which pass through the holes in the ears 9, and are secured to said ears by jam nuts 12, above and below said ears. Near the lower end of the shell is a threaded inlet boss 13 to which the discharge pipe from the sink is secured, and near the upper end of the shell, and located at any convenient point, relatively to the boss below, is a boss 14, threaded as shown, to which the outlet or discharge pipe is attached. The lower end of the shell has a removable plate 15, and both the plate and the lower end of the shell are provided with grooves 16 to receive a strip of packing 17. A spider 18, with three arms 19, which extend upwardly and have vertically disposed bends 20 at the ends, terminating in inturned hooks 20', so that when the plate 15 is placed in position and the hooks of the spider are passed through the cut-away portions 8 of the flange 7 the spider may be slightly turned, similar to the bayonet joint connection, thus holding the plate in position, after which the threaded stem 21, which passes centrally through the spider and engages with the plate, may be screwed up by the hand wheel 22, and thus bind the plate against the base of the shell.

Interiorly I provide a removable cage, having a series of grids or strainers. This comprises a rigid bent wire 23, secured at its lower ends to the plate by means of screws 24, so they may be readily detached, and on the wire standard thus formed I mount, as in this instance, three grids or straining elements, and a disk 25 at the upper end. These grids are designed for the special uses to which they may be put, but in this case, and for the purposes herein specified, I provide for each grid a ring 25', which fits snugly within the shell, and forms the screen with a plurality of cross wires 26, placed close together, as shown.

It will be observed that I place a cock 27 near the base of the shell, which is used for draining the shell preparatory to cleaning the same.

As the grid frame 23 is readily removable from the plate 15, I may, for certain uses, make them separate, so that for cleaning purposes the grids within need not be removed with the plate 15, but in using it as a grease trap it is desirable that these two elements should be attached to each other and removable whenever the trap is to be cleaned.

This form and arrangement of trap is easily attached to any closet or sink, and can be readily cleaned, and it will catch all foreign substances passing into the trap, and since the straining grids have large surfaces it is not likely to clog up in use.

The object of the disk 25 on the upper end of the straining grid frame is to draw out the impurities when the straining grids are removed, as the disk is, normally, above the outlets of the shell.

What I claim as new, is:

1. In a grease trap, a cylindrical shell closed at its upper end and open at its lower end, provided with inlet and outlet ports, a removable closure plate at the lower end having attached thereto, and removable with said closure plate, straining grids in a plane transverse to the longitudinal axis of the shell, an inlet pipe below the straining grid, and outlets above the straining grids.

2. In a grease trap, a cylindrical shell closed at its upper end and open below and having an inlet port at its lower end and an outlet port at its upper end, an external flange at its lower end having cut-away portions, a closure plate and means for securing the same to the shell, a series of straining grids within the shell, and attached to the closure plate, said grids being located between the inlet and outlet ports, and a disk on the upper end of the straining grid frame above the outlet ports.

3. In a grease trap, a vertically-disposed shell having inlet ports, a closure plate at the lower end, a vertical frame within said shell secured to said closure plate, a plurality of straining grids on said vertical frame on a plane transverse to the longitudinal axis of the shell and between the inlet and outlet ports, and a disk on the upper end of the grid frame to draw out the impurities when the said frame is removed.

Signed at the city of Los Angeles, State of California, this 3d day of April, 1909, in the presence of witnesses.

WILLIAM T. DUNCAN.

Witnesses:
  J. S. ZERBE,
  W. H. ANDERSON.